(12) United States Patent
Xu et al.

(10) Patent No.: US 12,511,065 B2
(45) Date of Patent: Dec. 30, 2025

(54) METHOD AND SYSTEM, DEVICE AND MEDIUM FOR DATA SEGMENTATION AND CHECK INFORMATION CALCULATION

(71) Applicant: HANGZHOU ALICLOUD FEITIAN INFORMATION TECHNOLOGY CO., LTD., Hangzhou (CN)

(72) Inventors: Peng Xu, Hangzhou (CN); Yu Du, Shanghai (CN); Zhongjie Wu, Beijing (CN); Su Zhou, Hangzhou (CN)

(73) Assignees: HANGZHOU ALICLOUD FEITIAN INFORMATION TECHNOLOGY CO., LTD., Hangzhou (CN); TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/685,213

(22) PCT Filed: Oct. 13, 2022

(86) PCT No.: PCT/CN2022/125190
§ 371 (c)(1),
(2) Date: Feb. 20, 2024

(87) PCT Pub. No.: WO2023/116141
PCT Pub. Date: Jun. 29, 2023

(65) Prior Publication Data
US 2024/0354021 A1    Oct. 24, 2024

(30) Foreign Application Priority Data

Dec. 21, 2021   (CN) .......................... 202111572453.8

(51) Int. Cl.
G06F 3/06    (2006.01)

(52) U.S. Cl.
CPC ............ *G06F 3/064* (2013.01); *G06F 3/0619* (2013.01); *G06F 3/0625* (2013.01); *G06F 3/0673* (2013.01)

(58) Field of Classification Search
CPC ....... G06F 3/064; G06F 3/0619; G06F 3/0673
See application file for complete search history.

(56) References Cited

U.S. PATENT DOCUMENTS 8,615,702 B2 * 12/2013 Yoo ..................... G06F 11/1012
                                                714/780
2014/0325265 A1    10/2014 Sun et al.
(Continued)

FOREIGN PATENT DOCUMENTS

CN    112800450 A    5/2021
CN    113176858 A    7/2021
(Continued)

OTHER PUBLICATIONS

International Search Report dated Jan. 4, 2023, in connection with International Application No. PCT/CN2022/125190.

*Primary Examiner* — Edward J Dudek, Jr.
(74) *Attorney, Agent, or Firm* — Wolf, Greenfield & Sacks, P.C.

(57) ABSTRACT

A data processing method, system and device, and a medium are provided. The method comprises: receiving a data stream; dicing the data stream to obtain a plurality of segmented data blocks; respectively calculating verification information corresponding to the plurality of segmented data blocks; and sending the segmented data blocks and the corresponding check information as a target logic block to a storage device.

20 Claims, 6 Drawing Sheets

(56) References Cited

U.S. PATENT DOCUMENTS

| | | | | |
|---|---|---|---|---|
| 2017/0308319 A1* | 10/2017 | Suzuki | ............... | G06F 3/0659 |
| 2021/0042189 A1* | 2/2021 | Whately | ............ | G06F 11/1044 |
| 2021/0064290 A1* | 3/2021 | Kanno | ............... | G06F 3/0604 |
| 2022/0066872 A1* | 3/2022 | Kwon | ............... | G06F 11/076 |
| 2022/0093202 A1* | 3/2022 | Wadhawan | ....... | G11C 29/1201 |
| 2022/0164281 A1* | 5/2022 | Coleman | ............. | G06F 3/0647 |
| 2022/0269415 A1* | 8/2022 | Sasaki | ............... | G06F 3/0655 |

FOREIGN PATENT DOCUMENTS

| | | |
|---|---|---|
| CN | 113296718 A | 8/2021 |
| CN | 113608699 A | 11/2021 |
| CN | 113626184 A | 11/2021 |

* cited by examiner

METHOD AND SYSTEM, DEVICE AND MEDIUM FOR DATA SEGMENTATION AND CHECK INFORMATION CALCULATION

The present application is a national stage filing under 35 U.S.C. § 371 of international application number PCT/CN2022/125190, filed Oct. 13, 2022, which claims priority to Chinese Patent Application No. 202111572453.8, filed with the Chinese Patent Office on Dec. 21, 2021, and entitled "Data Processing Method and System, Device and Medium," each of which is incorporated herein by reference in its entirety.

TECHNICAL FIELD

The present application relates to a field of computer technologies, and in particular, to a data processing method and system, a device and a medium.

BACKGROUND

With the development of computer technologies, functions of a network card are increasingly richer. The network card is not only responsible for two-layer forwarding between a server and the external, but also responsible for helping a processor to handle network-related matters.

In the related technologies, more and more storage engines are configured with a smart network card and a solid-state storage device, the smart network card being coupled to the solid-state storage device. It is discovered in practical applications that upon processing data, the smart network card does not work based on a logic block, whereas the solid-state storage device performs data storage based on the logic block. In order to ensure the integrity of data upon transmission and storage, cyclic redundancy check (CRC) information of data is usually calculated. When the smart network card and the solid-state storage device perform data transmission, the smart network card needs to calculate the CRC information based on a data record, whereas the solid-state storage device calculates the CRC information according to logic blocks obtained by segmentation, which needs to consume a computing power of a processor in a storage engine, and directly affects the working performance of the processor.

SUMMARY

To solve or improve problems existing in the related technologies, embodiments of the present application provide a data processing method and system, a device and a medium.

In a first aspect, the present application provides a data processing method. The method includes: receiving a data stream; performing a segmenting process on the data stream to obtain a plurality of segmented data blocks; respectively calculating check information corresponding to the plurality of segmented data blocks; sending the segmented data blocks and the corresponding check information, as a target logic block, to a storage device.

In a second aspect, the present application further provides a data processing method. The method includes: reading from a storage device a plurality of target logic blocks corresponding to a first data stream, wherein the plurality of target logic blocks are obtained by segmenting the first data stream; performing a check process on the target logic blocks based on first check information carried in the target logic blocks, the first check information being obtained by calculating based on the target logic blocks; calculating second check information corresponding to the first data stream, if the check passes; and sending the first data stream carrying the second check information.

In a third aspect, the present application further provides a data processing system, including: a Smart NIC configured to receive a data stream; perform a segmenting process on the data stream to obtain a plurality of segmented data blocks; respectively calculate check information corresponding to the plurality of segmented data blocks; send the segmented data blocks and corresponding check information, as a target logic block, to a storage device; or, configured to read from a storage device a plurality of target logic blocks corresponding to a first data stream, wherein the plurality of target logic blocks are obtained by segmenting the first data stream; perform a check process on the target logic blocks based on first check information carried in the target logic block, the first check information being obtained by calculating based on the target logic blocks; calculate second check information corresponding to the first data stream if the check passes; send the first data stream carrying the second check information; the storage device configured to store the target logic blocks which pass the check based on the check information; or configured to provide a plurality of target logic blocks each carrying the first check information.

In a fourth aspect, the present application further provides a computer readable medium on which are stored at least one instruction, at least one section of program, and a code set or an instruction set, the at least one instruction, the at least one section of program and the code set or the instruction set being loaded and executed by a processor to implement the data processing method stated in the first aspect or another data processing method stated in the second aspect.

In a fifth aspect, the present application further provides an electronic device including a memory and a processor, wherein the memory is used for storing a program; the processor is coupled to the memory and used for executing the program stored in the memory to implement the data processing method stated in the first aspect or another data processing method stated in the second aspect.

It should be appreciated that the above general depictions and the following detailed depictions are only exemplary and illustrative and cannot limit the present application.

BRIEF DESCRIPTION OF THE DRAWINGS

To describe the technical solutions in embodiments of the present application or the related technologies more clearly, the following briefly describes the accompanying drawings required for describing the embodiments or the related technologies. Apparently, the accompanying drawings in the following description are merely some embodiments of the present application, and a person of ordinary skill in the art may still derive other drawings from these accompanying drawings without making any inventive efforts.

DETAILED DESCRIPTION

To enable those skilled in the art to better understand solutions of the present application, technical solutions in embodiments of the present application will be described below clearly and completely with reference to figures in the embodiments of the present application.

In some processes described in the description, claims and the above figures of the present application, a plurality of operations occurring in a particular order are included and may be executed not in the order occurring in the text herein or executed in parallel. The sequence numbers of the operations, e.g., 101, 102, etc., are merely used to distinguish different operations, and the sequence numbers themselves do not represent any order of execution. In addition, these processes may include more or fewer operations, and these operations may be performed sequentially or in parallel. It needs to be appreciated that the terms such as "first" and "second" herein are intended to distinguish different messages, devices, modules, etc., and do not represent a sequential order, nor does they define that "first" and "second" are of different types. Furthermore, the embodiments described below are only a part of the embodiments of the present application, not all embodiments. Based on the embodiments in the present application, all the other embodiments obtained by those skilled in the art without making any inventive effort fall within the scope of protection of the present application.

Figure 1:
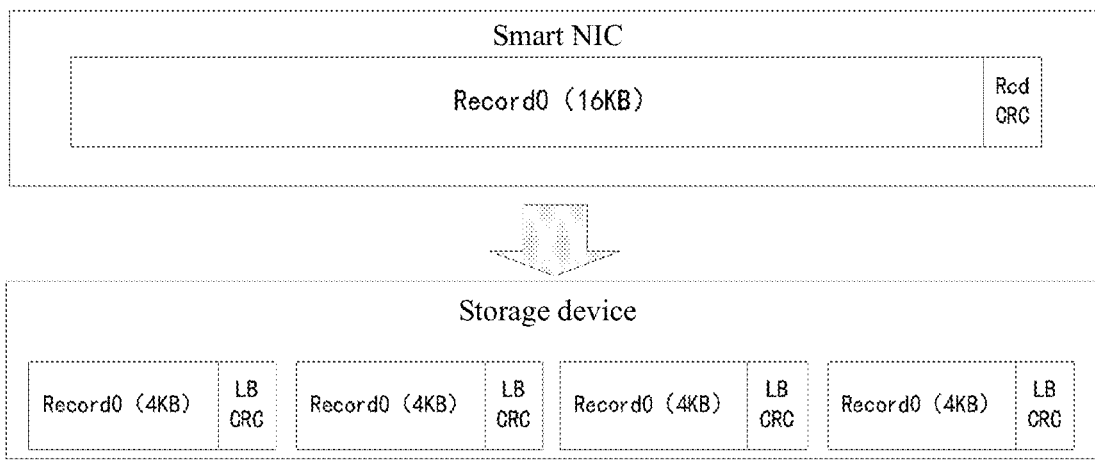
FIG. 1 is a schematic diagram of a data stream and logic blocks according to an embodiment of the present application.

In the technical solution of the present application, more and more storage engines are configured with a smart network card and a solid-state storage device, the smart network card being coupled to the solid-state storage device. It is discovered in partial applications that upon processing data, the smart network card does not work based on a logic block, but on data stream whose data length is variable, whereas the solid-state storage device performs data storage based on the logic block. FIG. 1 is a schematic diagram of a data stream and logic blocks according to an embodiment of the present application. It can be seen from FIG. 1 that in order to ensure the integrity of data upon transmission and storage, cyclic redundancy check (CRC) information about the data is usually calculated. When the smart network card and the solid-state storage device perform data transmission, the smart network card needs to calculate the CRC information (Rcd CRC in FIG. 1) based on the data stream, whereas the solid-state storage device is used to segment the data stream and calculate the CRC information (LB CRC in FIG. 1) according to logic blocks obtained from the segmentation of the data stream. There are a large number of logic blocks obtained from the segmentation. The calculation of the CRC information needs to consume a computing power of a processor in a storage engine, and affects the working performance of the processor in the storage engine. Therefore, it is desirable to provide a method of completing the CRC of the data stream and logic blocks without consuming resources of the processor in the storage engine. Illustration will be presented below through specific embodiments.

Figure 2:
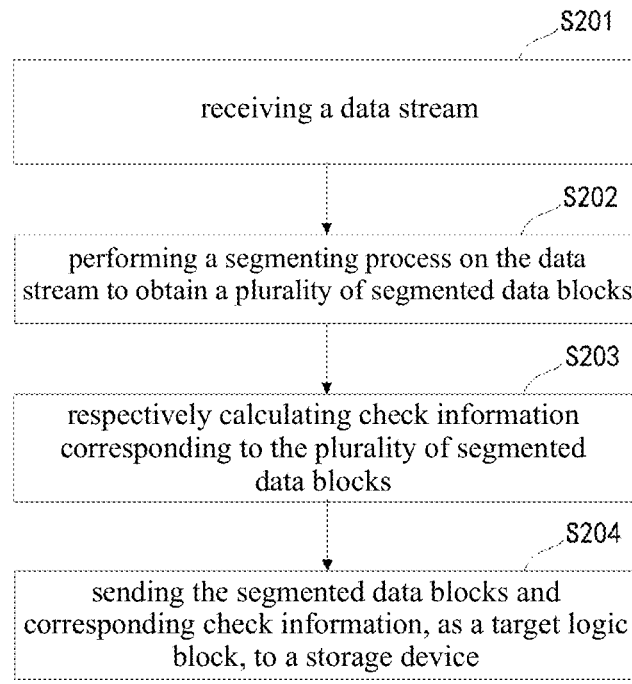
FIG. 2 is a flow chart of a data receiving method according to an embodiment of the present application.

FIG. 2 is a flow chart of a data receiving method according to an embodiment of the present application. In an actual application scenario, a subject of executing the method may be a Smart Network Interface Card (Smart NIC). The method shown in FIG. 2 includes the following steps.

In step S201, a data stream is received. In step S202, a segmenting process is performed on the data stream to obtain a plurality of segmented data blocks. In step S203, check information corresponding to the plurality of segmented data blocks is respectively calculated. In step S204, the segmented data blocks and the corresponding check information are sent, as a target logic block, to a storage device.

As known from FIG. 1, the data stream received by the Smart NIC contain a lot of data, and a length of data corresponding to the data stream is by far larger than a length of data that can be stored by each target logic block in the storage device. For example, the length of the data stream received by the Smart NIC is 18 KB, whereas the length of the target logic block is 4 KB. A plurality of target logic blocks are needed to store the data stream. The check information mentioned herein may be Cyclic Redundancy Check (CRC) information, and the storage device mentioned herein may be a solid-state storage device (e.g., a SSD).

Figure 3:
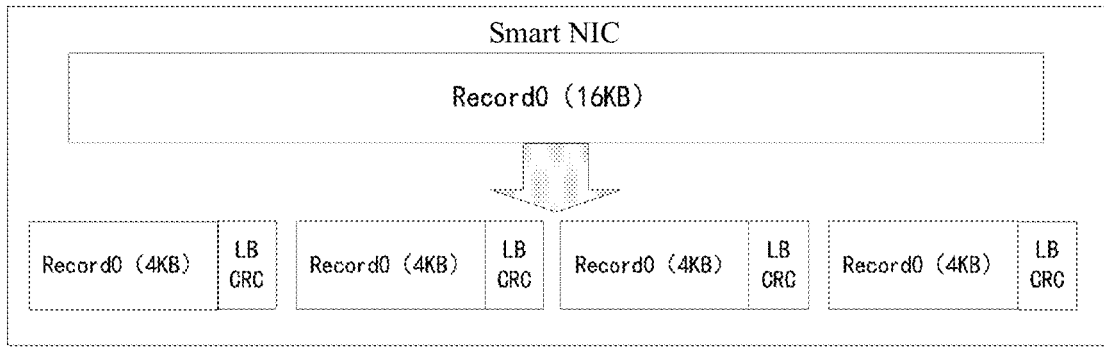
FIG. 3 is a schematic diagram of segmentation of a data stream according to an embodiment of the present application.

After receiving the data stream, the Smart NIC will perform overall check on the data stream according to the cyclic redundancy check information corresponding to the data stream. After the check passes, the Smart NIC performs a segmenting process on the data stream to obtain a plurality of segmented data blocks. For example, FIG. 3 is a schematic diagram of segmentation of the data stream according to an embodiment of the present application. It can be seen from FIG. 3 that the data stream of 16 KB is segmented by a size of 4 KB to obtain four segmented data blocks of 4 KB. Further, the Smart NIC uses a processor to calculate the check information such as Cyclic Redundancy Check CRC information corresponding to each segmented data block. Furthermore, the check information obtained from the calculation is added to the corresponding segmented data block to obtain a target logic block conforming to the size of the logic blocks of the storage device so that the storage device can directly store the segmented data blocks carrying the check information. Before performing storage, the storage device may use the check information corresponding to the segmented data blocks obtained by the Smart NIC from the calculation to complete the check, without requiring the processor in the storage engine to re-calculate the check information. This can effectively reduce the burden of the storage engine in calculating the cyclic redundancy check information.

In actual applications, when the segmented data blocks and the corresponding check information are sent to a storage device as a target logic block, the sending may be implemented in the following multiple manners.

In an implementation of the present application, after obtaining the segmented data blocks by the segmenting process and calculating to obtain the check information corresponding to the segmented data blocks, the Smart NIC combines the segmented data blocks with the check information to obtain target logic blocks. After obtaining a plurality of target logic blocks corresponding to the plurality of segmented data blocks respectively, the Smart NIC may respectively send the plurality of target logic blocks to the storage device for checking and storing.

In another implementation of the present application, after obtaining the segmented data blocks by the segmenting process and calculating to obtain the check information corresponding to the segmented data blocks, the Smart NIC combines the segmented data blocks with the check information to obtain target logic blocks. After obtaining a plurality of target logic blocks corresponding to the plurality of segmented data blocks respectively, the Smart NIC further sends, according to the data stream, the corresponding plurality of target logic blocks to the storage device by packaging the corresponding plurality of target logic blocks together or taking them as a new data stream. After receiving the new data stream, the storage device parses the new data stream or segments the new data stream according to a segmenting rule to obtain target logic blocks, and then checks the target logic blocks by using the check information carried in the target logic blocks, without need to require the storage engine to re-calculate the check information and without need to check the new data stream.

Figure 4:
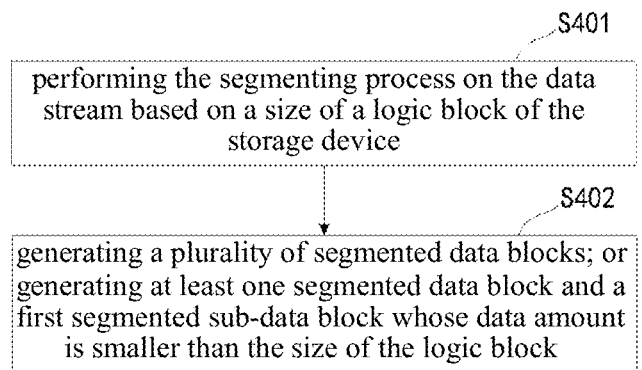
FIG. 4 is a flow chart of a segmenting method according to an embodiment of the present application.

FIG. 4 is a flow chart of a segmenting method according to an embodiment of the present application. An implementation of step S202 of the present application includes the following steps.

In step S401, the segmenting process is performed on the data stream based on a size of a logic block of the storage device. In step S402, a plurality of segmented data blocks are generated, or at least one segmented data block and a first segmented sub-data block whose data amount is smaller than the size of the logic block are generated.

Upon the segmentation, it is necessary to perform the segmenting process on the data stream according to the size of the logic block of the storage device to meet the checking and storing needs of the storage device. For example, if the size of a data stream is 16 KB, the size of check information is 4 B, and the size of the logic block of the storage device A1 is 4 KB, then four target logic blocks with a size of 4 KB+4 B are obtained after the segmenting process. If the size of the logic block of the storage device A2 is 8 KB, two target logic blocks with a size of 8 KB+4 B are obtained after the segmenting process.

In actual applications, the size of the data stream processed by the intelligent Smart NIC is variable, and it is quite probable that when the data stream is segmented, complete segmented data blocks cannot be obtained. For example, if the size of the data stream is 18 KB, the size of the check information is 4 B, and the size of the logic block of the storage device A1 is 4 KB, four target logic blocks with the size of 4 KB+4 B and one first segmented sub-data block with the size of 2 KB are obtained after the segmenting process.

It needs to be appreciated that the size of the logic block in the storage device described herein is the size of active data and does not contain check information. However, the target logic block is a sum of the size of the logic block and the size of the check information. For example, if the size of the logic block is 4 KB and the size of the check information is 4 B, the size of the target logic block is 4 KB+4 B.

In one or more embodiments of the present application, after performing the segmenting process on the data stream based on the size of the logic block of the storage device, the method further includes: determining data lengths respectively corresponding to the segmented data blocks, and check information addresses of the check information in the segmented data blocks; configuring configuration descriptors of the segmented data blocks based on the data lengths.

Sending the segmented data blocks and the corresponding check information, as the target logic block, to the storage device includes: configuring the cyclic redundancy check information to the check information addresses in the segmented data blocks according to description types in the segmented data blocks indicated by the configuration descriptors, and generating the target logic block which can be processed by the storage device; sending the target logic block to the storage device.

When the data stream is segmented, global configuration needs to be performed on the Smart NIC to obtain the target logic blocks meeting the requirements of the storage device. The set global configuration parameters include the size of the logic block, the size of check information, the number of logic blocks obtained through calculation, an address of a configuration information list, an injection function of the check information of the target logic blocks, a data stream processing mode (writing to the storage device or reading from the storage device), whether to check the check information, etc. The data stream is segmented based on the above global configuration parameters to obtain the segmented data blocks.

As stated above, when the data stream is segmented, since the size of the data stream is uncertain, the size of the obtained segmented data blocks is also uncertain. Each segmented data block needs to be described by virtue of the descriptor. The description information contained in the configuration descriptor includes: address information, a data length, a description type. Furthermore, a configuration process is performed on the segmented data blocks and check information based on the configuration descriptors to obtain the target logic blocks.

In order to facilitate understanding, examples are given below for illustration purpose.

Figure 5:
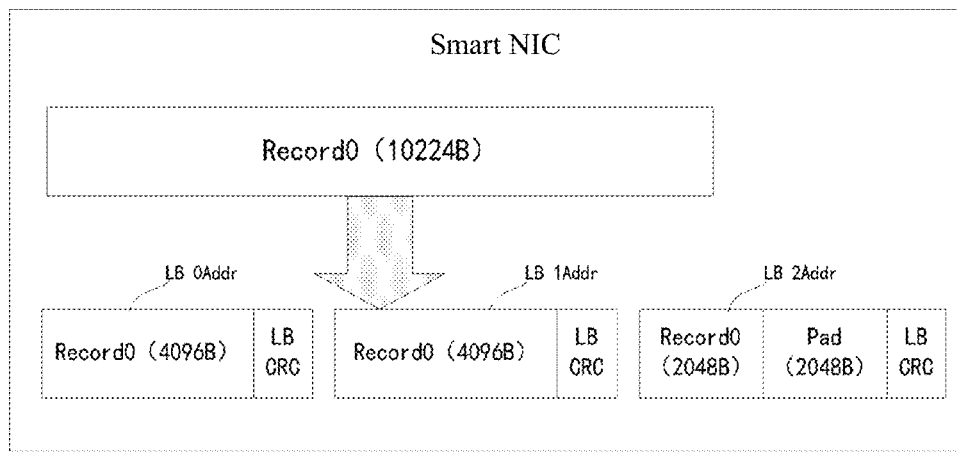
FIG. 5 is a schematic diagram of performing a segmenting process on a data stream according to an embodiment of the present application.

For example, FIG. 5 is a schematic diagram of performing a segmenting process on the data stream according to an embodiment of the present application. A Scatter Gather List (SGL) technology may be employed to implement the configuration of segmented data blocks in Smart NIC.

Assuming the length of the data stream is 10224 B, the global configuration includes: LB size=4096 B (logic block length 4096 B), CRC_Size=4 B (cyclic redundancy check information length 4 B); 1. LB count=3 (the number of target logic blocks is 3); 2. SGL List Address (the list address of SGL); 3. LB_CRC_Inject=TRUE (a function of injecting the check information of the target logic block is activated); 4. DMA_DIR=IN (a Direct Memory Access (DMA) engine is inbound, namely, writing the data stream received by the SmartNIC into the storage device); 5. Transaction_CRC_Check=TRUE (activate the CRC check).

The SGL list contains the following configuration descriptors: SGL Descriptor 0: LB_0_Mem_Addr, length=4096 B+4 B, DescType=Data; the SGL0 descriptor is configured an address of a target logic block 0, the data length 4096 B+4 B, and the description type being data;

SGL Descriptor 1: LB_1_Mem_Addr, length=4096 B+4 B, DescType=Data; the SGL1 descriptor is configured with an address of a target logic block 1, the data length 4096 B+4 B, and the description type being data; SGL Descriptor 2: LB_2_Mem_Addr, length=2048 B, DescType=Data; the SGL2 descriptor is configured with an address of a target logic block 2 for storing the first segmented sub-data block, the data length 2048 B, and the description type being data; SGL Descriptor 3; LB_2_Mem_Addr+2048 B, length=2048 B, DescType=Padding; since there is still free data space in the target logic block 2, the SGL3 descriptor is configured with an offset of 2048 B on the basis of an address of the target logic block 2, a data length 2048 B, and a description type being padding.

That is to say, each segmented data block is configured with its corresponding configuration descriptor. The SGL list is generated based on the above descriptors. The DMA engine will load the SGL list and transfer the data of the data stream according to the configuration descriptors in the SGL list. The cyclic redundancy check information will be injected continuously after each logic block, thereby obtaining a complete target logic block. The target logic block is stored in the storage device at a specified address (the address may be specified by the descriptor). This example uses a DIF mode. A DIX mode may also be used, wherein the cyclic redundancy check information (LB_CRC) of the target logic block is put in a single contiguous buffer.

In actual applications, respectively calculating check information corresponding to the plurality of segmented data blocks includes: adding, if the first segmented sub-data block is obtained by segmenting, padding information to a free data space in the first segmented sub-data block according to the size of the logic block; re-calculating the corresponding check information based on the segmented data block containing the padding information and the first segmented sub-data block.

As known from the embodiment corresponding to FIG. 4, when the segmenting process is actually performed, the first segmented sub-data block might be obtained, and the size of the data amount of the first segmented sub-data block is smaller than that of the logic block, so the data amount does not satisfy the data amount needed by a target logic block. At this time, padding may be performed by adding padding information to the free data space. As described in SGL Descriptor 3 in the above embodiment, padding information is added on the basis of the second target logic block LB_2_Mem_Addr, the data length of the padding information is Length=2048 B, and the corresponding description type is DescType=Padding.

After completion of the above padding operation, temporary cyclic redundancy check information of a temporary logic block consisting of the first segmented sub-data block and the padding information may be further calculated. Furthermore, the SGL list is loaded according to the global configuration information, to inject the temporary cyclic redundancy check information into the temporary logic block.

The data in the temporary logic block obtained at this time is incomplete. If a new data stream is not received any more after the temporary logic block, the temporary logic block will be stored as a target logic block. If a new data stream is further received after the temporary logic block, when the next data stream is received a portion is segmented from the new data stream and padded to a position in the temporary logic block where padding information lies. The embodiment will be described below in detail with reference to FIG. 6.

Figure 6:
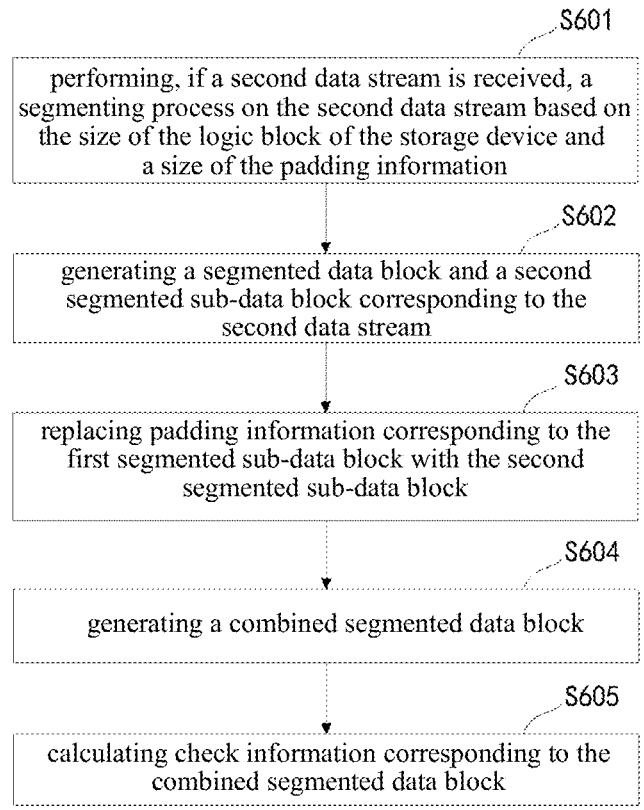
FIG. 6 is a flow chart of a second data stream processing mode according to an embodiment of the present application.

FIG. 6 is a flow chart of a second data stream processing mode according to an embodiment of the present application. As can be seen from FIG. 6, after generating the target logic block which may be processed by the storage device, the data processing method according to the embodiment of the present application further includes the following steps.

In step S601, if a second data stream is received, a segmenting process is performed on the second data stream based on the size of the logic block of the storage device and a size of the padding information. In step S602, a segmented data block and a second segmented sub-data block corresponding to the second data stream are generated. In step S603, padding information corresponding to the first segmented sub-data block is replaced with the second segmented sub-data block. In step S604, a combined segmented data block is generated. In step S605, check information corresponding to the combined segmented data block is calculated.

After obtaining the first segmented sub-data block by segmenting as in the above embodiment, the Smart NIC receives the second data stream, and performs the segmenting process on the second data stream according to the size of the logic block of the storage device and the size of the padding information. It needs to be appreciated that when the segmenting process is performed on the second data stream, the size of the obtained second segmented sub-data block is consistent with that of the padding information so that the second segmented sub-data block is used to replace the padding information to obtain the combined segmented data block. While the second segmented sub-data block is obtained, a plurality of segmented data blocks and third segmented sub-data blocks corresponding to the second data stream are also obtained. The third segmented sub-data blocks may be processed in the same data processing manner as the first segmented sub-data block as described above. For example, the logic block size is 4 KB, the size of the first segmented sub-data block is 1 KB, and the size of the second data stream is 20 KB. As such, when the second data stream is segmented, a second segmented sub-data block with a size of 3 KB is first obtained, and then a combining process is performed on the first segmented sub-data block of 1 KB and the second segmented sub-data block of 3 KB to obtain a combined segmented data block. In addition, four 4 KB-segmented data blocks and one 1 KB-third segmented sub-data block are also obtained.

In order to facilitate understanding, detailed depictions will be presented below through an embodiment.

Figure 7:
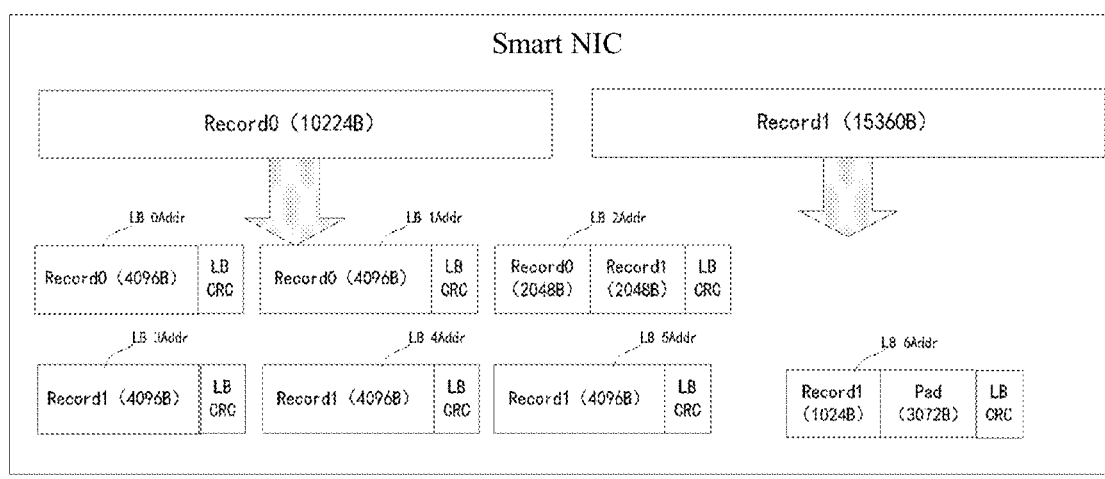
FIG. 7 is a schematic diagram of performing a segmenting process on a second data stream according to an embodiment of the present application.

FIG. 7 is a schematic diagram of performing a segmenting process on a second data stream according to an embodiment of the present application. A Scatter Gather List (SGL) technology may be employed to implement the configuration of segmented data blocks in the Smart NIC.

Assuming the length of the second data stream is 15360 B, the global configuration includes: LB size=4096 B (logic block length 4096 B), CRC_Size=4 B (cyclic redundancy check information length 4 B); 1. LB count=5 (the number of target logic blocks is 5); 2. SGL List Address (the list address of SGL); 3. LB_CRC_Inject=TRUE (a function of injecting the check information of the target logic block is activated); 4. DMA_DIR=IN (the DMA engine is inbound, namely, writing the data stream received by the Smart NIC into the storage device); 5. Transaction_CRC_Check=TRUE (activate the CRC check). The SGL list contains the following configuration descriptors: SGL Descriptor 0): LB_2_Mem_Addr, length=2048 B, DescType=Pre-Load. The SGL descriptor is configured with an address of the target logic block 2, the data length 2048

B, and the description type being a pre-load type. This indicates that the data with a length 2048 B in the first segmented sub-data black is already loaded in the target logic block 2. SGL Descriptor 1: LB_2_Mem_Addr+2048 B, length=2048 B+4 B, DescType=Data; the SGL1 descriptor is configured with an offset of 2048 B on the basis of the address of the target logic block 2, the data length 2048 B+4 B, and the description type being data.

The global configuration further includes: SGL Descriptor 2: LB_3_Mem_Addr, length=4096 B+4 B, DescType=Data; the SGL2 descriptor is configured with an address of the target logic block 3, the data length 4096 B+4 B, and the description type being data. SGL Descriptor 3: LB_4_Mem_Addr, length=4096 B+4 B, DescType=Data; the SGL3 descriptor is configured with an address of the target logic block 4, the data length 4096 B+4 B, and the description type being data. SGL Descriptor 4: LB_5_Mem_Addr, length=4096 B+4 B, DescType=Data; the SGL4 descriptor is configured with an address of the target logic block 5, the data length 4096 B+4 B, and the description type being data. SGL Descriptor 5: LB_6_Mem_Addr, length=1024 B, DescType=Data; the SGL5 descriptor is configured with an address of a target logic block 6 for storing the third segmented sub-data block, the data length 1024 B, and the description type being data. SGL Descriptor 6: LB_6_Mem_Addr+1024 B, length=3072 B. DescType=Padding. Since there is still free data space in the target logic block 6, the SGL6 descriptor is configured with an offset of 1024 B on the basis of an address of the target logic block 6, the data length 3072 B, and the description type being padding.

The DMA engine will load the SGL list. The first SGL descriptor is of a preload type, which means that the DMA engine will load data from a start address 2048 B to the DMA engine, and also calculate the CRC for the pre-loaded first segmented sub-data block. The second SGL descriptor transmits a header of the second data stream (the data length is 2048 B), the header will be combined with the preloaded first segmented sub-data block, and the cyclic redundancy check will be injected after the logic block after the data of 2048 B is transmitted. Then, the aligned parts will be transferred to the SGL5 descriptor according to the SGL2 descriptor. Finally, the SGL6 descriptor is padded to a boundary of the logic block. An NVMe solid-state hard drive may use logic block-based cyclic redundancy checks that will be checked and stored in the solid-state hard drive.

After the target logic blocks are obtained by the above embodiment, sending the target logic blocks to the storage device includes: sending at least one target logic block carrying the check information to the storage device, so that the storage device performs a check process based on the check information, and stores the target logic block which passed the check.

Based on the above embodiments, after the DMA engine loads the SGL and performs the segmenting process on the data stream, a target logic block that may be processed by the storage device is obtained. The target logic block is sent to the storage device, so that the storage device checks according to the check information carried in the target logic block. It can be seen therefrom that in the embodiment of the present application, it is unnecessary to require the storage device or the storage engine to use the processor to re-calculate the corresponding check information such as CRC for each target logic block, and it is the Smart NIC alone that accomplish the work of calculating the check information of the target logic block.

In one or more embodiments of the present application, the method further includes: reading from the storage device a plurality of target logic blocks corresponding to the first data stream, if a data reading request is received; performing the check process on the target logic blocks based on first check information carried in the target logic blocks; calculating second check information corresponding to the first data stream, if the check passes; sending the first data stream carrying the second check information.

The Smart NIC may also read from the storage device a target logic block corresponding to the first data stream. The Smart NIC may directly perform check work on the check information without calculating the check information again. For particulars, reference may be made to the embodiments corresponding to FIG. 8 and FIG. 9. No detailed depictions will be given any more here.

Figure 8:
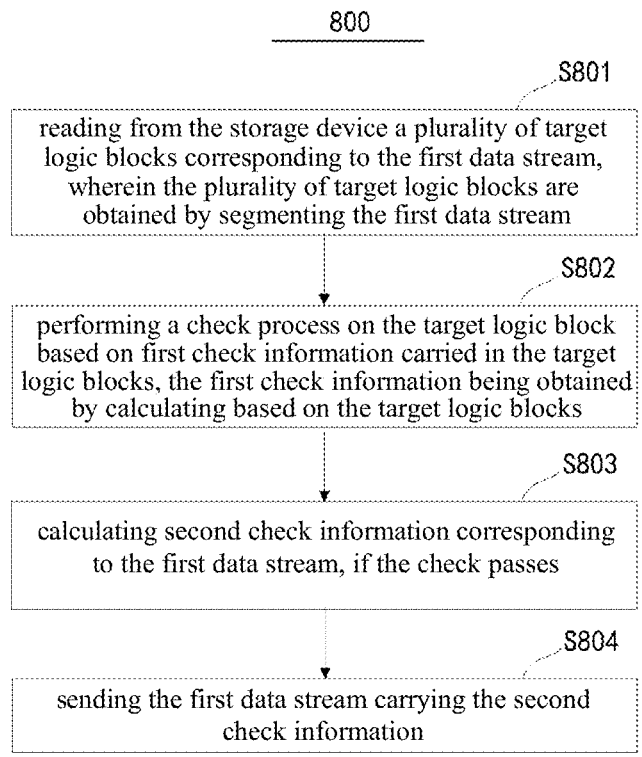
FIG. 8 is a flow diagram of another data processing method according to an embodiment of the present application.

Based on the same idea, an embodiment of the present application further provides a data processing method. The subject implementing the method may be a Smart NIC. FIG. 8 is a flow diagram of another data processing method 800 according to an embodiment of the present application. The method shown in FIG. 8 includes the following steps.

In step S801, a plurality of target logic blocks corresponding to a first data stream are read from a storage device, wherein the plurality of target logic blocks are obtained by segmenting the first data stream.

In step S802, a check process is performed on the target logic blocks based on first check information carried in the target logic blocks, the first check information being obtained by calculating based on the target logic blocks.

In step S803: if the check passes, second check information corresponding to the first data stream is calculated.

In step S804, the first data stream carrying the second check information is sent.

Data is stored in units of logic blocks in the storage device. When there is a need to read data, the Smart NIC may read from the storage device a plurality of target logic blocks corresponding to the needed first data stream. It needs to be appreciated that the target logic block here is obtained after performing the segmenting process on the first data stream and stored in the storage device. Reference may be made to the embodiments corresponding to FIG. 2 through FIG. 7 for a specific process of segmenting and generating the target logic blocks, which will not be described in detail again here.

Since the duly-calculated check information is carried in the target logic block, the storage device and the Smart NIC may perform security check on the target logic block directly based on the check information. After the check passes, the data in the plurality of target logic blocks are combined to obtain the first data stream. Further, the Smart NIC calculates the corresponding second check information based on the first data stream, so as to send out the first data stream carrying the second check information, for example, to send the first data stream from device A where the Smart NIC lies to device B.

In actual applications, the data contained in the target logic blocks may be composed of data of a plurality of data streams together. If a first target logic block in the plurality of target logic blocks is obtained based on a combined segmented data block, a data length of a second sub-data record in the first target logic block is determined. The combined segmented data block contains a first segmented sub-data block corresponding to the first data stream and a second segmented sub-data block corresponding to the second data stream. A bit bucket identification is added to the second segmented sub-data block in the first target logic block based on the data length.

Figure 9:
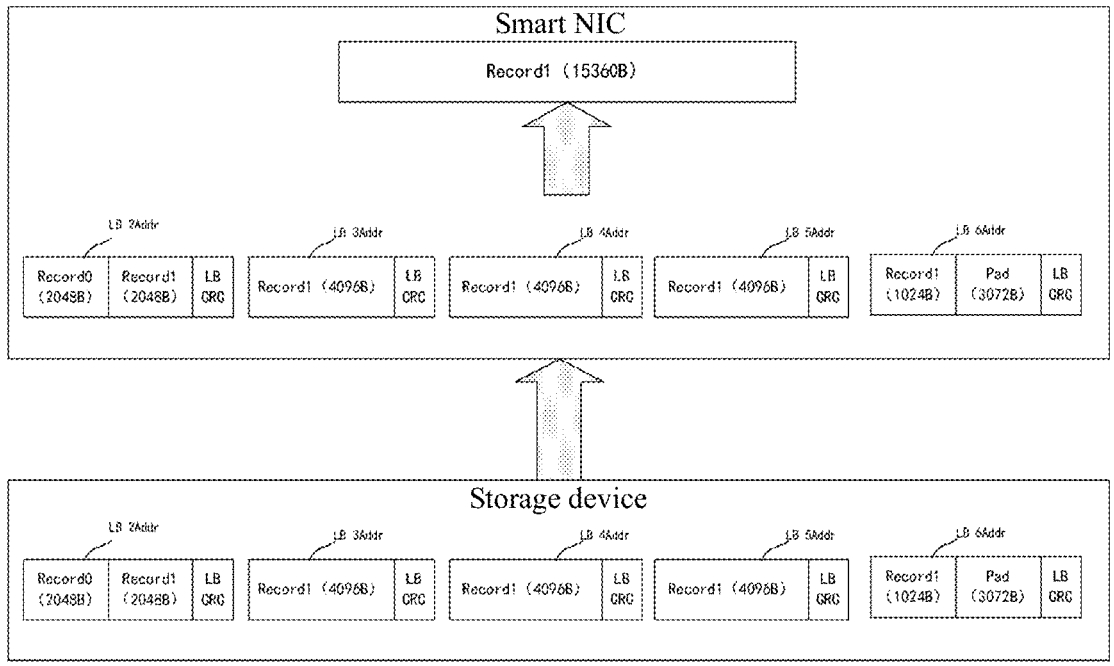
FIG. 9 is a schematic diagram of data reading according to an embodiment of the present application.

FIG. 9 is a schematic diagram of data reading according to an embodiment of the present application. As may be seen from FIG. 7, the plurality of target logic blocks corresponding to the first data stream contain the data of the segmented data block and the check information (CRC shown in FIG. 9). The data contained in the first target logic block includes the data of the first segmented sub-data block of the first data stream and the data of the second segmented sub-data block of the second data stream. In order to help the Smart NIC to process the first target logic block, the bit bucket identification may be added to the data corresponding to the second segmented sub-data block in the first target logic block through the descriptor. When subsequent data is sent out, only the data corresponding to the first segmented sub-data block in the first target logic block is sent out.

In one or more embodiments of the present application, calculating the second check information of the first data stream includes: determining a first segmented sub-data block belonging to the first data stream based on the bit bucket identification contained in the first target logic block; performing combination based on the plurality of target logic blocks and the first segmented sub-data block to obtain the first data stream; calculating the second check information corresponding to the first data stream.

In order to facilitate understanding, illustration will be presented in conjunction with an embodiment.

The global configuration includes: 1. LB count=5 (the number of target logic blocks is 5); 2. SGL List Address (the list address of SGL); 3. LB_CRC_Check=TRUE (a function of injecting the check information of the target logic block is activated); 4. Transaction_CRC_INJECT=TRUE (injection of CRC is activated); 5. DMA_DIR=out (the DMA engine is outbound, i.e., the Smart NIC reads the data stream from the storage device).

The descriptors in the SGL list are set accordingly as follows: 1. SGL Descriptor 0: LB_2_Mem_Addr, length=2048 B, and DescType=Bit-Bucket. As shown in FIG. 7, the first target logic block LB2 is obtained based on the combined segmented data block. As such, an SGL0 descriptor is configured for LB2 as follows: the address being LB2, the data length being 2048 B, and the description type being a bit bucket type; 2. SGL Descriptor 1: LB_2_Mem_Addr+2048 B, length=2048 B+4 B, DescType=Data; the SGL1 descriptor is configured with an address of the target logic block 3, the data length 4096 B+4 B, and the description type being data; 3. SGL Descriptor 2: LB_3_Mem_Addr, length=4096 B+4 B, DescType=Data; the SGL2 descriptor is configured with an address of the target logic block 3, the data length 4096 B+4 B, and the description type being data; 4. SGL Descriptor 3: LB_4_Mem_Addr, length=4096 B+4 B, DescType=Data; the SGL3 descriptor is configured with an address of the target logic block 4, the data length 4096 B+4 B, and the description type being data; 5. SGL Descriptor 4: LB_5_Mem_Addr, length=4096 B+4 B, DescType=Data; the SGL4 descriptor is configured with an address of the target logic block 5, the data length 4096 B+4 B, and the description type being data; 6. SGL Descriptor 5: LB_6_Mem_Addr, length=1024 B, DescType=Data; the SGL5 descriptor is configured with an address of the target logic block 6, the data length 1024 B, and the description type being data. 7. SGL Descriptor 6: LB_6_Mem_Addr, length=3072 B, DescType=Bit-Bucket; the SGL6 descriptor is configured with an address of the target logic block 6, the data length 3072 B, and the description type being a bit bucket type.

An SGL bit bucket descriptor indicates that the data of the second segmented sub-data block marked with a bit bucket descriptor will be loaded together with the data in the first segmented sub-data block to the DMA engine, the cyclic redundancy check of the first target logic block is checked, but the data of the second segmented sub-data block will not be transmitted out.

Transaction_CRC_INJECT indicates that when the Smart NIC transmits the first data stream to the Ethernet, it will append check information (e.g., a cyclic redundancy check (CRC)) calculated by the Smart NIC after the first data stream.

In one or more embodiments of the present application, the method further includes: receiving a data stream; performing a segmenting process on the data stream to obtain a plurality of segmented data blocks; respectively calculating check information corresponding to the plurality of segmented data blocks; sending the segmented data blocks and the corresponding check information, as a target logic block, to a storage device. The Smart NIC may further perform check information calculation and perform the segmenting process on the data stream when receiving the data stream. For particulars, reference may be made to the embodiments corresponding to FIG. 2 through FIG. 7. No detailed depictions will be given any more here.

Figure 10:
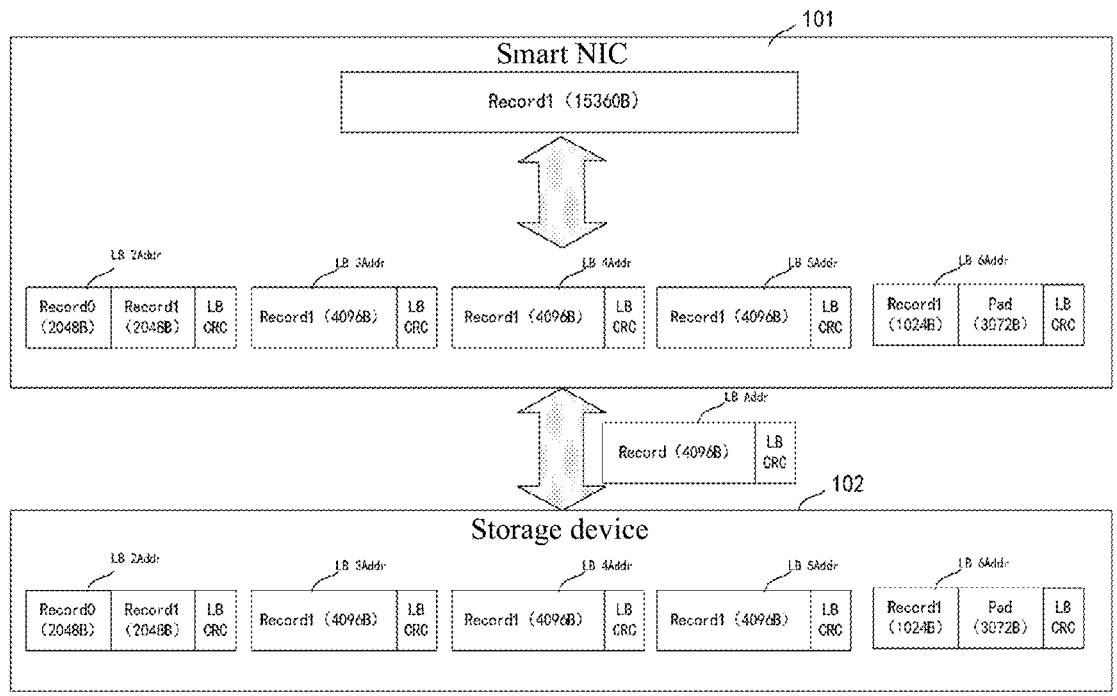
FIG. 10 is a block diagram of a data processing system according to an embodiment of the present application.

Based on the same idea, an embodiment of the present application further provides a data processing system. FIG. 10 is a block diagram of a data processing system according to an embodiment of the present application. As shown in FIG. 10, the system includes: a Smart NIC 101 configured to receive a data stream; perform a segmenting process on the data stream to obtain a plurality of segmented data blocks; respectively calculate check information corresponding to the plurality of segmented data blocks; send the segmented data blocks and corresponding check information, as a target logic block, to a storage device; or, configured to read from a storage device a plurality of target logic blocks corresponding to a first data stream, wherein the plurality of target logic blocks are obtained by segmenting the first data stream; perform a check process on the target logic blocks based on first check information carried in the target logic block, the first check information being obtained by calculating based on the target logic blocks; calculate second check information corresponding to the first data stream if the check passes; send the first data stream carrying the second check information; the storage device 102 configured to store the target logic blocks which pass the check based on the check information; or configured to provide a plurality of target logic blocks each carrying the first check information.

Figure 11:
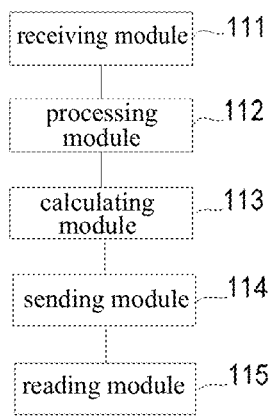
FIG. 11 is a block diagram of a data processing apparatus according to an embodiment of the present application.

Based on the same idea, the embodiment of the present application further provides a data processing apparatus. FIG. 11 is a block diagram of a data processing apparatus according to an embodiment of the present application. The data processing apparatus includes: a receiving module 111 configured to receive a data stream; a processing module 112 configured to perform a segmenting process on the data stream to obtain a plurality of segmented data blocks; a calculating module 113 configured to respectively calculate check information corresponding to the plurality of segmented data blocks; a sending module 114 configured to send the segmented data blocks and corresponding check information, as a target logic block, to a storage device.

In an implementation of the present application, the processing module 112 is further configured to perform the segmenting process on the data stream based on a size of a logic block of the storage device; generate the plurality of segmented data blocks; or generating at least one segmented data block and a first segmented sub-data block whose data amount is smaller than the size of the logic block.

In an implementation of the present application, the processing module 112 is further configured to determine data lengths respectively corresponding to the segmented data blocks, and check information addresses of the check information in the segmented data blocks; configure configuration descriptors of the segmented data blocks based on the data lengths; configuring the check information to the check information addresses in the segmented data blocks according to description types in the segmented data blocks indicated by the configuration descriptors, and generating the target logic block which can be processed by the storage device; sending the target logic block to the storage device.

In an implementation of the present application, the calculating module 113 is further configured to add, if the first segmented sub-data block is obtained by segmenting, padding information to a free data space in the first segmented sub-data block according to the size of the logic block; re-calculate the corresponding check information based on the segmented data block containing the padding information and the first segmented sub-data block.

In an implementation of the present application, the calculating module 113 is further configured to perform, if a second data stream is received, a segmenting process on the second data stream based on the size of the logic block of the storage device and a size of the padding information; generate a segmented data block and a second segmented sub-data block corresponding to the second data stream; replace padding information corresponding to the first segmented sub-data block with the second segmented sub-data block; generate a combined segmented data block; calculate check information corresponding to the combined segmented data block.

In an implementation of the present application, the sending module 114 is configured to send at least one target logic block carrying the check information to the storage device, so that the storage device performs a check process based on the check information, and stores the target logic block which passed the check.

The data processing system further includes a reading module 115 configured to read from the storage device a plurality of target logic blocks corresponding to the first data stream, if a data reading request is received; perform the check process on the target logic blocks based on first check information carried in the target logic blocks; calculate second check information corresponding to the first data stream, if the check passes; send the first data stream carrying the second check information.

Figure 12:
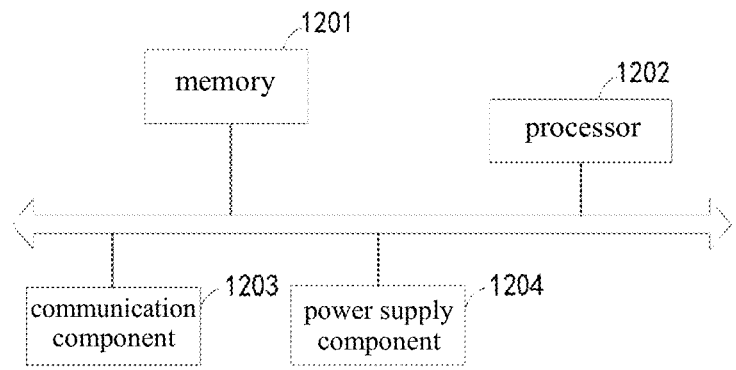
FIG. 12 is a block diagram of an electronic device according to an embodiment of the present application.

An embodiment of the present application further provides an electronic device. FIG. 12 is a block diagram of an electronic device according to an embodiment of the present application. The electronic device includes a memory 1201, a processor 1202 and a communication component 1203, wherein the memory 1201 is used for storing a program, the processor 1202 is coupled to the memory and used for executing the program stored in the memory to: receive a data stream; perform a segmenting process on the data stream to obtain a plurality of segmented data blocks; respectively calculate check information corresponding to the plurality of segmented data blocks; send the segmented data blocks and corresponding check information, as a target logic block, to a storage device.

The memory 1201 may be configured to store various other data to support operations on the electronic device. These data generally include instructions for any application or method operated on the electronic device. The memory may be implemented by any type of volatile or non-volatile memory device or a combination of thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic or optical disks.

In an implementation of the present application, the processor 1202 in the present embodiment may specifically be: a programmable switch processing chip configured with a data replication engine and capable of replicating the received data.

The above processor 1202, when executing a program in memory, may perform other functions in addition to those described above. For particulars, please refer to the depictions of the above embodiments. As shown in FIG. 12, in an embodiment of the present application, the electronic device further includes: other components such as a power supply component 1204.

Figure 13:
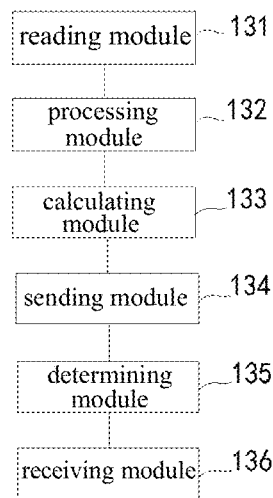
FIG. 13 is a block diagram of another data processing apparatus according to an embodiment of the present application.

Based on the same idea, an embodiment of the present application further provides a data processing apparatus. FIG. 13 is a block diagram of another data processing apparatus according to an embodiment of the present application. The data processing apparatus includes: a reading module 131 configured to read from a storage device a plurality of target logic blocks corresponding to a first data stream, wherein the plurality of target logic blocks are obtained by segmenting the first data stream; a processing module 132 configured to perform a check process on the target logic block based on first check information carried in the target logic block, the first check information being obtained by calculating based on the target logic block; a calculating module 133 configured to calculate, if the check passes, second check information corresponding to the first data stream; and a sending module 134 configured to send the first data stream carrying the second check information.

In an implementation of the present application, the data processing apparatus further includes a determining module 135 configured to determine a data length of a second sub-data record in the first target logic block, if a first target logic block in the plurality of target logic blocks is obtained based on a combined segmented data block; the combined segmented data block contains a first segmented sub-data block corresponding to the first data stream and a second segmented sub-data block corresponding to the second data stream; add a bit bucket identification to the second segmented sub-data block in the first target logic block based on the data length.

In an implementation of the present application, the calculating module 133 is further configured to determine a first segmented sub-data block belonging to the first data stream based on the bit bucket identification contained in the first target logic block; perform combination based on the plurality of target logic blocks and the first segmented sub-data block to obtain the first data stream; calculate the second check information corresponding to the first data stream.

In an implementation of the present application, the data processing apparatus may perform the following operations: receive a data stream; perform a segmenting process on the data stream to obtain a plurality of segmented data blocks; respectively calculate check information corresponding to the plurality of segmented data blocks; send the segmented data blocks and corresponding check information, as a target logic block, to a storage device.

Figure 14:
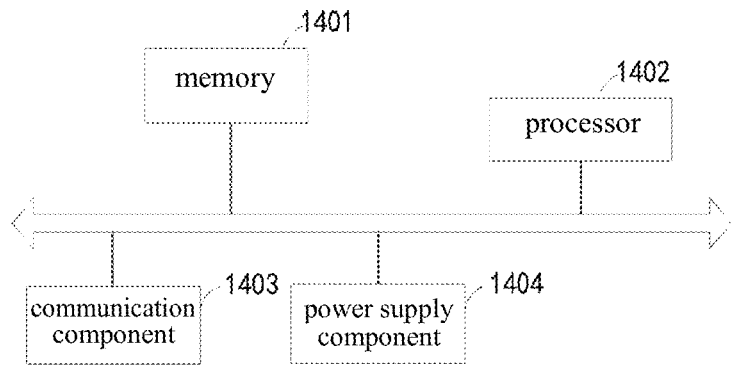
FIG. 14 is a block diagram of another electronic device according to an embodiment of the present application.

An embodiment of the present application further provides an electronic device. FIG. 14 is a block diagram of another electronic device according to an embodiment of the present application. The electronic device includes a memory 1401, a processor 1402 and a communication component 1403. The memory 1401 is used for storing a program. The processor 1402 coupled to the memory and used for executing the program stored in the memory to: read from a storage device a plurality of target logic blocks corresponding to a first data stream, wherein the plurality of target logic blocks are obtained by segmenting the first data stream; perform a check process on the target logic block based on first check information carried in the target logic block, the first check information being obtained by calculating based on the target logic block; calculate, if the check passes, second check information corresponding to the first data stream; and send the first data stream carrying the second check information.

The memory 1401 may be configured to store various other data to support operations on the electronic device. These data generally include instructions for any application or method operated on the electronic device. The memory may be implemented by any type of volatile or non-volatile memory device or a combination of thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic or optical disks.

In an implementation of the present application, the processor 1402 in the present embodiment may specifically be: a programmable switch processing chip configured with a data replication engine and capable of replicating the received data.

The above processor 1402, when executing a program in memory, may perform other functions in addition to those described above. For particulars, please refer to the depictions of the above embodiments. As shown in FIG. 14, in an embodiment of the present application, the electronic device further includes: other components such as a power supply component 1404.

Based on the above embodiments, after receiving a first data stream to be stored, the Smart NIC will perform a segmenting process on the first data stream, to obtain logic blocks which meet the check and storage demands of the storage device. Furthermore, the Smart NIC calculates the cyclic redundancy check information of each segmented data block, and generates a target logic block based on the segmented data block and the cyclic redundancy check information. Through the above solution, the Smart NIC segments the first data stream according to the demand for the logic block size of the solid-state storage device, and calculates and obtains the cyclic redundancy check information of the segmented data blocks, so that in the processing of the first data stream, the storage device and the storage engine are not required to participate in the calculation process of the cyclic redundancy check information, and the workload of the solid state storage device and the storage engine may be effectively reduced.

The embodiments of the apparatus described above are merely illustrative, where the units described as separate parts may be or may not be physically separated, the parts shown as units may be or may not be physical units, i.e., they can be located in one place, or distributed in a plurality of network units. One can select some or all the modules to achieve the solution of the present embodiment. Those skilled in the art can understand and implement the solution without involving any inventive effort.

From the above depictions of the embodiments, it will be clear to a person skilled in the art that the embodiments may be implemented by means of software plus a necessary general-purpose hardware platform, but also by means of hardware. With this understanding in mind, the above-described technical solutions may be in essence or a portion thereof making contribution over the prior art may be embodied in the form of a software product which may be stored on a computer-readable storage medium, such as ROM/RAM, magnetic diskettes, optical disks, etc., that includes instructions for causing a computer device (which may be a personal computer, a server, or a network device, etc.) to perform the methods stated in various embodiments or portions of the embodiments.

Finally, it should be noted that: the above-mentioned embodiments are only intended to illustrate the technical solutions of the present application, not to limit the same; while the present application has been described in detail with reference to the foregoing embodiments, those skilled in the art will appreciate that: the technical solutions disclosed in the above-mentioned embodiments can still be modified or some of the technical features can be replaced by equivalents. However, these modifications or substitutions do not cause the essence of corresponding technical solutions to depart from the spirit and scope of the technical solutions of the embodiments of the present application.

What is claimed is:

1. A data processing method, applied to a smart network card, comprising:
   receiving a data stream;
   performing a segmenting process on the data stream to obtain a plurality of segmented data blocks;
   respectively calculating check information corresponding to a respective one of the plurality of segmented data blocks;
   combining the respective one of the plurality of segmented data blocks with the corresponding check information into a target logic block that conforms to a size of a logic block of a storage device, to obtain a plurality of target logic blocks respectively corresponding to the plurality of segmented data blocks, and sending the plurality of target logic blocks, to the storage device.

2. The method of claim 1, wherein performing the segmenting process on the data stream to obtain the plurality of segmented data blocks comprises:
   performing the segmenting process on the data stream based on the size of the logic block of the storage device;
   generating the plurality of segmented data blocks; or generating at least one segmented data block and a first segmented sub-data block whose data amount is smaller than the size of the logic block.

3. The method of claim 2, wherein after performing the segmenting process on the data stream based on the size of the logic block of the storage device, the method further comprises:
   determining data lengths respectively corresponding to the segmented data blocks, and check information addresses of the check information in the segmented data blocks;

configuring configuration descriptors of the segmented data blocks based on the data lengths;

sending the segmented data blocks and the corresponding check information, as the target logic blocks, to the storage device comprises:

configuring the check information to the check information addresses in the segmented data blocks according to description types in the segmented data blocks indicated by the configuration descriptors, and generating the target logic blocks which can be processed by the storage device;

sending the target logic blocks to the storage device.

4. The method of claim 2, wherein respectively calculating check information corresponding to the plurality of segmented data blocks comprises:

adding, if the first segmented sub-data block is obtained by segmenting, padding information to a free data space in the first segmented sub-data block according to the size of the logic block;

re-calculating the corresponding check information based on the segmented data block containing the padding information and the first segmented sub-data block.

5. The method of claim 4, wherein after generating the target logic blocks which can be processed by the storage device, the method further comprises:

performing, if a second data stream is received, a segmenting process on the second data stream based on the size of the logic block of the storage device and a size of the padding information;

generating a segmented data block and a second segmented sub-data block corresponding to the second data stream;

replacing padding information corresponding to the first segmented sub-data block with the second segmented sub-data block;

generating a combined segmented data block;

calculating check information corresponding to the combined segmented data block.

6. The method of claim 3, wherein sending the target logic blocks to the storage device comprises:

sending at least one target logic block carrying the check information to the storage device, so that the storage device performs a check process based on the check information, and stores the target logic block which passed the check.

7. The method of claim 1, further comprising:

reading from the storage device a plurality of target logic blocks corresponding to the first data stream, if a data reading request is received;

performing the check process on the target logic blocks based on first check information carried in the target logic blocks;

calculating second check information corresponding to the first data stream, if the check passes;

sending the first data stream carrying the second check information.

8. A data processing method, applied to a smart network card, comprising:

reading from a storage device a plurality of target logic blocks corresponding to a first data stream, wherein the plurality of target logic blocks are obtained by: segmenting the first data stream to obtain a plurality of segmented data blocks; respectively calculating check information corresponding to a respective one of the plurality of segmented data blocks; and combining the respective one of the plurality of segmented data blocks with the corresponding check information into a target logic block that conforms to a size of a logic block of the storage device, to obtain the plurality of the target logic blocks respectively corresponding to the plurality of segmented data blocks of the first data stream;

performing a check process on the target logic blocks based on first check information carried in the target logic blocks, the first check information being obtained by calculating based on the target logic blocks;

calculating second check information corresponding to the first data stream, if the check passes;

sending the first data stream carrying the second check information.

9. The method of claim 8, further comprising:

determining, if a first target logic block in the plurality of target logic blocks is obtained based on a combined segmented data block, a data length of a second sub-data record in the first target logic block, the combined segmented data block containing a first segmented sub-data block corresponding to the first data stream and a second segmented sub-data block corresponding to a second data stream;

adding a bit bucket identification to the second segmented sub-data block in the first target logic block based on the data length.

10. The method of claim 9, wherein calculating the second check information corresponding to the first data stream comprises:

determining a first segmented sub-data block belonging to the first data stream based on the bit bucket identification contained in the first target logic block;

performing combination based on the plurality of target logic blocks and the first segmented sub-data block to obtain the first data stream;

calculating the second check information corresponding to the first data stream.

11. The method of claim 8, further comprising:

receiving a data stream;

performing a segmenting process on the data stream to obtain a plurality of segmented data blocks;

respectively calculating check information corresponding to a respective one of the plurality of segmented data blocks;

sending the segmented data blocks and the corresponding check information, as the target logic blocks, to the storage device.

12. A data processing system, comprising:

a Smart NIC configured to receive a data stream; perform a segmenting process on the data stream to obtain a plurality of segmented data blocks; respectively calculate check information corresponding to a respective one of the plurality of segmented data blocks; combine the respective one of the plurality of segmented data blocks with the corresponding check information into a target logic block that conforms to a size of a logic block of a storage device, to obtain a plurality of target logic blocks respectively corresponding to the plurality of segmented data blocks, and send the plurality of target logic blocks, to the storage device; or, configured to read from a storage device a plurality of target logic blocks corresponding to a first data stream, wherein the plurality of target logic blocks are obtained by: segmenting the first data stream to obtain a plurality of segmented data blocks; respectively calculating check information corresponding to a respective one of the plurality of segmented data blocks; and combining the respective one of the plurality of segmented data blocks with the corresponding check information into a target logic block that conforms to a size of a logic block of the storage device, to obtain the plurality of the target logic blocks respectively corresponding to the plurality of segmented data blocks of the first data stream; perform a check process on the target logic blocks based on first check information carried in the target logic block, the first check information being obtained by calculating based on the target logic blocks; calculate second check information corresponding to the first data stream if the check passes; send the first data stream carrying the second check information;

the storage device configured to store the target logic blocks which pass the check based on the check information; or configured to provide a plurality of target logic blocks each carrying the first check information.

13. A non-transitory computer readable medium on which are stored at least one instruction, at least one section of program, and a code set or an instruction set, the at least one instruction, the at least one section of program and the code set or the instruction set being loaded and executed by a processor to implement the method according to claim 1.

14. An electronic device, comprising a memory and a Smart NIC comprising a processor, wherein
the memory is used for storing a program;
the processor is coupled to the memory and used for executing the program stored in the memory to implement the method according to claim 1.

15. The method of claim 3, wherein respectively calculating check information corresponding to the plurality of segmented data blocks comprises:
adding, if the first segmented sub-data block is obtained by segmenting, padding information to a free data space in the first segmented sub-data block according to the size of the logic block;
re-calculating the corresponding check information based on the segmented data block containing the padding information and the first segmented sub-data block.

16. The method of claim 15, wherein after generating the target logic blocks which can be processed by the storage device, the method further comprises:
performing, if a second data stream is received, a segmenting process on the second data stream based on the size of the logic block of the storage device and a size of the padding information;
generating a segmented data block and a second segmented sub-data block corresponding to the second data stream;
replacing padding information corresponding to the first segmented sub-data block with the second segmented sub-data block;
generating a combined segmented data block;
calculating check information corresponding to the combined segmented data block.

17. The non-transitory computer readable medium according to claim 13, wherein the at least one instruction, the at least one section of program and the code set or the instruction set are loaded and executed by a processor to implement the method according to claim 2.

18. The non-transitory computer readable medium according to claim 13, wherein the at least one instruction, the at least one section of program and the code set or the instruction set are loaded and executed by a processor to implement the method according to claim 8.

19. The electronic device according to claim 14, wherein the processor is coupled to the memory and used for executing the program stored in the memory to implement the method according to claim 2.

20. The electronic device according to claim 14, wherein the processor is coupled to the memory and used for executing the program stored in the memory to implement the method according to claim 8.

* * * * *